July 13, 1948.                H. M. GOLDBERG ET AL                2,445,062
                                      SEAL
                              Filed Jan. 19, 1945
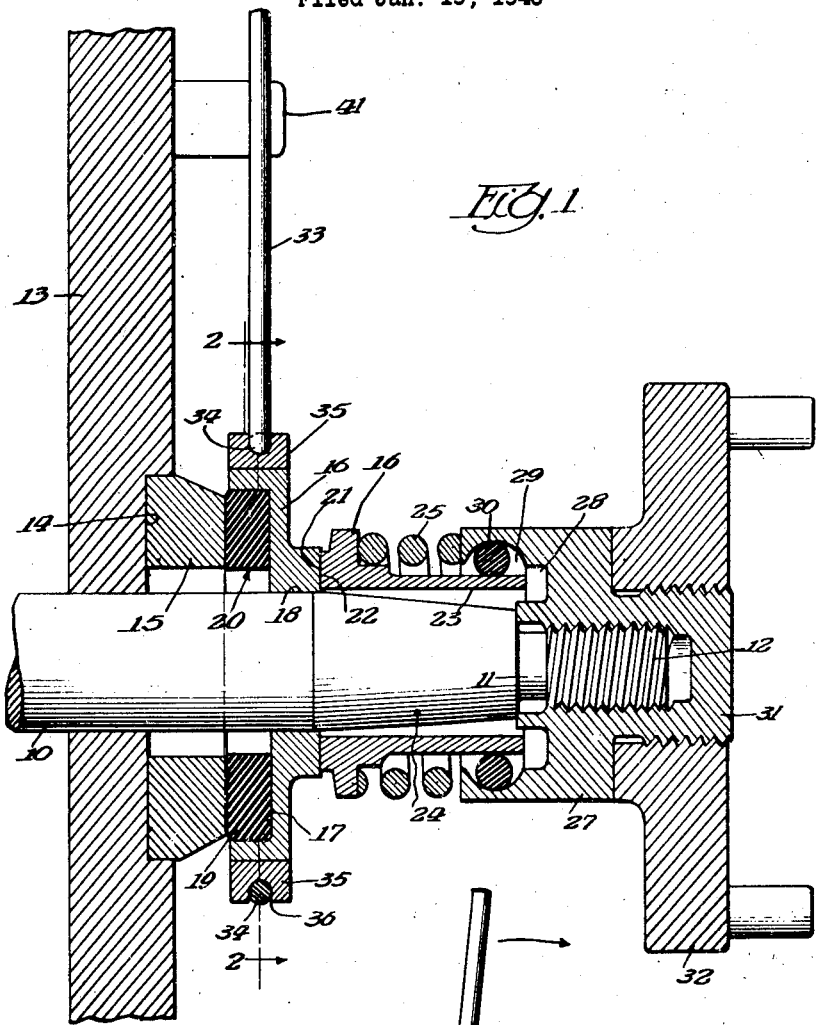
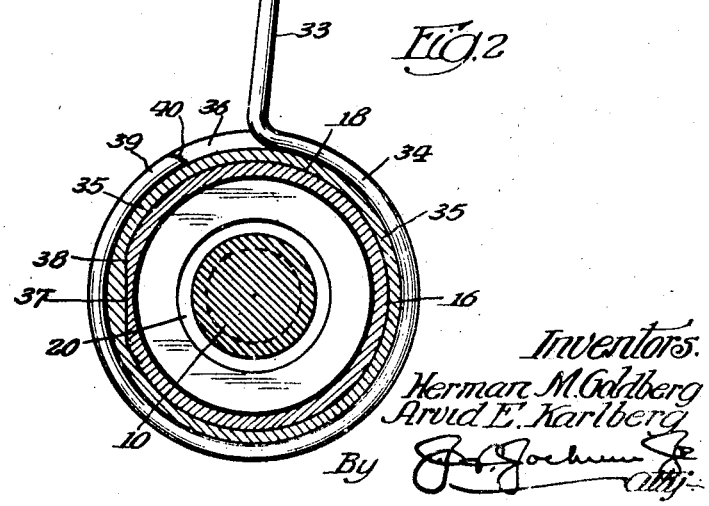
Inventors.
Herman M. Goldberg
Arvid E. Karlberg
By Patented July 13, 1948

2,445,062

UNITED STATES PATENT OFFICE 2,445,062

SEAL

Herman M. Goldberg and Arvid E. Karlberg, Chicago, Ill., assignors to Chicago Seal Co., Chicago, Ill., a corporation of Illinois Application January 19, 1945, Serial No. 573,602

11 Claims. (Cl. 286—11.15)

This invention relates, in general, to shaft seals, but more specifically to the element of the seal which seals the shaft to prevent the escape of fluids through the opening in a wall or journal through which the shaft projects.

In seals of this character, it has been found that this particular element of the seal has a tendency to rotate with the shaft, and that if such element is maintained against rotation, a more effective and efficient sealing will be produced, and the wear of the parts reduced. It is, therefore, one of the objects of this invention to provide improved means for maintaining this element against such rotation.

A further object is to provide an improved stop device, preferably in the form of a brake or clutch, adapted to be applied to the seal element, which device will permit a limited movement of the seal element in one direction, but will become effective to lock or prevent the seal from further rotary movement when the brake device contacts with the stop.

A further object is to provide an improved seal assembly of this character, which is effective as a replacement unit, without necessitating any alteration of the wall or shaft in connection with which the seal is adapted to be employed.

To the attainment of these ends and the accomplishment of other new and useful objects as will appear, the invention consists in the features of novelty in substantially the construction, combination and arrangement of the several parts, hereinafter more fully described and claimed, and shown in the accompanying drawing, in which Fig. 1 is a view, partly in elevation and partly in section, of a portion of a shaft having a seal assembly, constructed in accordance with the principles of this invention, applied thereto.

Fig. 2 is a detail sectional view taken on line 2—2, Fig. 1.

In the drawing, the reference numeral 10 designates a portion of a rotatable shaft which is to be sealed, and which may be provided with a reduced end 11 that is threaded, as at 12. The shaft passes through a wall 13, and the wall is preferably formed with a recess 14 encompassing the shaft opening. Seated in the recess is an annular member 15, which is formed of any suitable material and extends for a suitable distance beyond the face of the wall, to form a bearing or abutment member which preferably projects beyond the outer face of the wall.

The seal assembly is adapted for use as a replacement unit, and is also adapted to be applied without alteration of the shaft. It is also adapted to be initially installed in the apparatus, of which the rotating shaft 10 forms a part.

The seal consists, essentially, of a sealing element 16 having a recess 17 opening through one face, and the recess is preferably of a diameter somewhat greater than the diameter of the opening 18 through the element. Seated within the recess 17 is an annular gasket or sealing material 19 that substantially fills the recess, but is provided with an opening 20 therethrough, which registers with the opening 18, the opening 20 being of a diameter greater than the diameter of the opening 18.

The element 16 is provided with a bearing surface 21, against which a bearing surface 22 of a sleeve 23 that surrounds the shaft 10, has a running contact. If desired, the portion 24 of the shaft 10 which is disposed within the sleeve 23 may be tapered, so as to allow of a relative angular movement, one with respect to the other. Encompassing the sleeve 23 is a coil spring 25, one end of which abuts a shoulder 26 of the sleeve, and the other end thereof bears against a fitting 27 that is screwed upon the threaded end 12 of the shaft 10. The fitting 27 may be provided with a recess 28, into which one end of the sleeve 23 projects, and the entrance of the recess is of a diameter considerably greater than the external diameter of the adjacent portion of the sleeve 23.

Seated within an annular recess 29 in the wall of the opening in the fitting 27, is an annular resilient gasket or packing 30, which latter forms a seal against the escape of oil or gas that may find its way along the shaft through the sleeve. By adjustment of the fitting 27 upon the end of the shaft, the stress of the spring 25 may be varied, and as the spring operates to hold the bearing surfaces 22—21 in contact, the degree of friction therebetween will be controlled, as the surface 22 has a running contact with the surface 21. The fitting 27 may be provided with a reduced threaded end 31, upon which a coupling member 32 may be secured.

With a seal of this character, there is a tendency for the element 16 to rotate. Therefore, in order to maintain this element against such rotation, there is provided a brake member which consists of an arm 33 constructed of any suitable material, one end of the arm being shaped to form a resilient loop or coil 34. The arm 33 is secured to the element 16 by encompassing the latter, and in order to effect this attachment, there may be provided an annular member 35 which is provided with an open peripheral groove 36 of a depth suitable to hold the looped end 34 of the arm.

This annular member 35 may be secured to the element 16, for rotation therewith, in any suitable manner, so that it will rotate therewith. This may be accomplished by providing a flattened surface 37 on the element 16, with which a flattened surface 38 on the annular member 35 cooperates.

In use, the annular member 35 is secured to the element 16, and the resilient loop 34 is placed upon the element 35 by being seated within the groove 36. The end 39 of the loop terminates short of the arm 33, and, if desired, the extremity 40 of the loop may be slightly deflected so as to insure an effective gripping upon the bottom of the groove 36.

When the parts are assembled as shown in Fig. 1, the sealing material 19 will engage the face of the member 15, and will be held thereagainst by the spring 25. The arm 33 will project radially from the periphery of the elements 16—35, so as to engage or contact a projection or stop 41 on the wall 13.

With the parts thus assembled, and when the shaft 10 is rotated, the tendency of the element 16 will be to move in the direction indicated by the arrow in Fig. 2; that is, in a clockwise direction. This limited movement of the element 16 will continue until the arm 33 contacts the stop 41. Any further tendency of the element 16 to move in the same direction will cause the arm 33, in co-operation with the stop 41, to render the brake or loop 34 of the arm effective to produce a gripping or binding action upon the element 16, and thereby lock the element against further rotation. With this construction, the element 16 may be freely rotated in an anti-clockwise direction with respect to the arm 33 and loop 34, if desired, to shift the point of engagement of the packing 19 with the end of the bearing 15.

If desired, the elements 16 and 35 may be of integral construction, or the element 35 may be omitted and the annular groove 36 may be provided in the periphery of the element 16.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. A replacement seal for a rotating member, which latter has a portion extending through an opening in a wall or bearing, said seal embodying a seal element encompassing said member and comprising an annular element having a seal seat on one face and sealing means on its opposite face, the sealing means adapted for engagement with the wall or bearing around said opening, and a stop element co-operating with said seal element, said stop element embodying an arm provided with a resilient portion encompassing said annular element, said arm adapted to engage a stop whereby to contract said resilient portion about said annular element to maintain the latter against rotation with respect to the wall in one direction.

2. A replacement seal for a rotating member, which latter has a portion extending through an opening in a wall or bearing, said seal embodying an element having a finished annular surface forming a seal seat on one face and a sealing surface on the opposite face, for engagement with the wall surrounding said opening, a contractable member encompassing said element, and means co-operating with said member and operable to contract it about said element for maintaining the element against angular movement in one direction with respect to said wall, said contractable member operating to permit a limited degree of angular movement of said element with respect to said member in the same direction of movement of said element.

3. A replacement seal for a rotating member, which latter has a portion extending through an opening in a wall or bearing, said seal embodying an element having a finished annular surface forming a seal seat on one face and an annular recess in the opposite face, sealing material seated in said recess for engagement with the wall surrounding said opening, and a member having an open loop seated in a circumferential recess in said element, one end of said loop extending radially beyond said element to provide an arm adapted to engage a stop, to cause said loop to secure said element against angular movement with respect to said wall in one direction.

4. A replacement seal for a rotating member, which latter has a portion extending through an opening in a wall or bearing, said seal embodying an element having annular sealing surfaces on opposite faces thereof, and a member having an open loop seated in a circumferential recess in said element, one end of said loop extending radially beyond said element to provide an arm adapted to engage a stop, to cause said loop to bind said element against angular movement with respect to said wall in one direction, said loop being yieldable to permit a limited degree of movement of said element with respect to said wall in the same direction.

5. A replacement seal for a rotating member, which latter has a portion extending through an opening in a wall or bearing, said seal embodying a seal element encompassing said member and comprising an annular element having a seal seat on one face and sealing means on its opposite face, the sealing means adapted for engagement with the wall or bearing around said opening, a contractable member encompassing said annular member, and an arm on said contractable member extending radially beyond said annular member for engagement with a fixed stop on said wall to control said contractable member, whereby to secure said annular member against angular movement with respect to said wall.

6. A replacement seal for a rotating member, which latter has a portion extending through an opening in a wall or bearing, said seal embodying an annular element having a finished annular surface forming a seal seat on one face and an annular recess in the opposite face, sealing material seated in said recess for engagement with the wall surrounding said opening, an annular member encompassing and secured to said annular element and forming therewith a seal unit for assemby on said portion of said rotating member, a radial member extending beyond said annular member, and a loop connection between said radial member and said annular member, said radial member adapted for engagement with a stop spaced from said opening and operating to bind said loop about said annular element to hold it against angular movement in one direction with respect to said wall.

7. A replacement seal for a rotating member, which latter has a portion extending through an opening in a wall or bearing, said seal embodying an annular element having a finished annular surface forming a seal seat on one face and an annular recess in the opposite face, sealing material seated in said recess for engagement with the wall surrounding said opening, an annular member encompassing and secured to said annular element and forming therewith a seal unit for assembly on said portion of said rotating member, a radial member extending beyond said annular member, and a connection between said radial member and said annular member, said radial member adapted for engagement with a stop spaced from said opening and operating to control said connection to secure said annular element against angular movement in one direction with respect to said wall, said connection embodying an open resilient loop seated in a circumferential recess in said annular member.

8. A replacement seal for a rotating member, which latter has a portion extending through an opening in a wall or bearing, said seal embodying an annular element having a finished annular surface forming a seal seat on one face and an annular recess in the opposite face, sealing material seated in said recess for engagement with the wall surrounding said opening, a radial projecting member connected with said annular element for engagement with a stop spaced from said opening to maintain said element against angular movement with respect to said wall, said connection embodying a clutch element operating to permit a limited relative movement of said annular element with respect to said radial member.

9. A replacement seal for a rotating member, which latter has a portion extending through an opening in a wall or bearing, said seal embodying an annular element having a finished annular surface forming a seal seat on one face and an annular recess in the opposite face, sealing material seated in said recess for engagement with the wall surrounding said opening, a radial projecting member connected with said annular element for engagement with a stop spaced from said opening to maintain said element against angular movement with respect to said wall, said connection embodying an open resilient loop seated in a peripheral recess in said annular element and operating to permit a limited relative movement of said annular element with respect to said radial member.

10. A replacement seal for a rotating member, which latter has a portion extending through an opening in a wall or bearing, said seal embodying an annular element having a finished annular surface forming a seal seat on one face and a sealing surface on the opposite face for engagement with the wall surrounding said opening, a contractable element separate from and carried by and co-operating with said element for maintaining said element against rotation, and means operatively related to said element and adapted to engage a stop spaced from said opening to contract the same.

11. A seal for a rotating member, which latter has a portion extending through an opening in a wall or bearing, said seal embodying an annular seal element encompassing said member and provided with opposite sealing faces, a stop element, the body portion of which encompasses the periphery of said seal element and has a radially projecting arm adapted to engage a stop spaced from said opening, and means whereby when said arm engages said stop, said stop element will bind upon the said seal element to maintain said seal element against angular movement with respect to said wall.

HERMAN M. GOLDBERG.
ARVID E. KARLBERG.

REFERENCES CITED

The following references are of record in the file of this patent:

UNITED STATES PATENTS

| Number | Name | Date |
| --- | --- | --- |
| 2,305,726 | Meyer | Dec. 22, 1942 |